INVENTOR
LOWELL L. SPERRY

ATTORNEYS

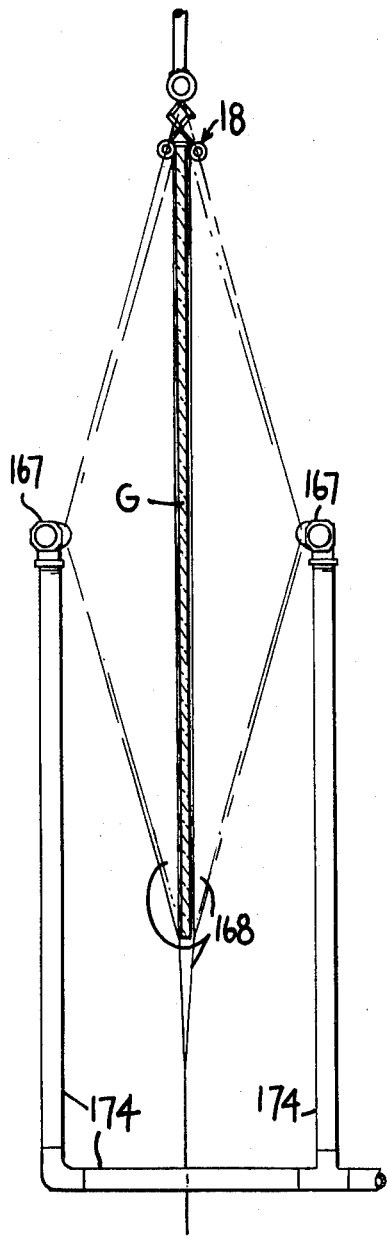
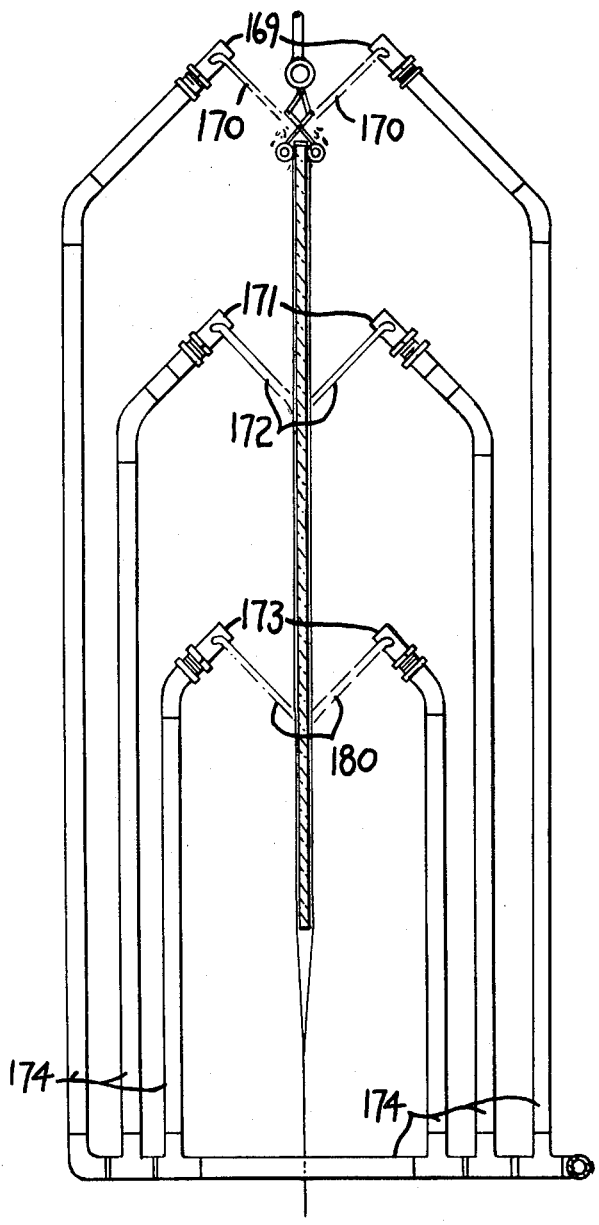
FIG. 3
FIG. 4
INVENTOR
LOWELL L. SPERRY

INVENTOR
LOWELL L. SPERRY

United States Patent Office 3,725,024
Patented Apr. 3, 1973

3,725,024
TEMPERING GLASS SHEETS WITH
LIQUID FLOWS
Lowell L. Sperry, Lower Burrell, Pa., assignor to
PPG Industries, Inc., Pittsburgh, Pa.
Filed Jan. 21, 1971, Ser. No. 108,661
Int. Cl. C03b 27/00
U.S. Cl. 65—114                 16 Claims

ABSTRACT OF THE DISCLOSURE

Thermal treatment of glass sheets, particularly to impart a controlled thermal temper that is approximately unchanging from sheet to sheet, on a high speed, mass production basis in such a manner that each glass sheet so treated has acceptable optical properties. The present invention obtains this desired result by a so-called flood quenching, which comprises applying a plurality of continuous or approximately continuous flows of a liquid selected for its heat exchange properties across the entire surface of the sheet and removing the flows of liquid from contact with the sheet after the liquid has moved across the surface of the sheet and has cooled the sheet sufficiently to impart a thermal temper of the desired magnitude. A novel type of glass gripping tongs is provided to minimize any interference with free movement of the liquid flows that would be expected from using tongs. Means is provided to avoid top edge breakage and means is provided to minimize bubbles entrapped within the tempering liquid when the latter is applied to a glass surface.

BACKGROUND OF THE INVENTION

Glass is known to be very strong when its surface is stressed in compression and very weak when its surface is stressed in tension. Tempered glass articles are stronger than untempered articles because they have a stress pattern that consists of a zone of compression stress extending inward from the surface of the glass and a zone of tension stress completely surrounded by the zone of compression stress. During use, when tempered glass articles are subjected to forces that induce tension stress, the compression stress zone in the surface regions provides a safety factor that resists glass breakage by providing a compression stress vector that must be overcome in addition to the tension stress vector that is needed to fracture unstresesd glass. Therefore, tempered glass is less likely to fracture than untempered glass. Furthermore, even when it fractures, the interior tension stress in tempered glass causes tempered glass to fracture into a high number of smoothly surfaced particles that are less dangerous to nearby persons than the larger, jagged particles that characterize fractured, untempered glass.

Glass sheets have been thermally tempered by heating sheets to an elevated temperature range approaching the softening point of the glass and then suddenly chilling the glass sufficiently rapidly to cool the surfaces to below the strain point while the interior portions remain heated to a sufficiently higher temperature. The surface portion thus sets while the interior is above the temperature at which it becomes set. When the interior cools, it contracts and pulls the surface portion into a state of compression stress. The relative rates at which the surface portion and interior cool to below the strain point determine the magnitude of the compression stress that is established.

Historically, glass sheets have been tempered by dip quenching the heated glass in a fluid. Immersion in a bath of oil or molten metal or a molten salt is suggested in U.S. Pat. No. 178,797 to Royer, U.S. Pat. No. 170,339 to Brookfield, and U.S. Pat. No. 2,145,119 to Littleton, respectively, U.S. Pat No. 2,198,739 to Phillips suggests a bath of 1:2:4 trichlorbenzene as a chilling agent and U.S. Pat. No. 3,186,816 to Wartenberg suggests immersing the hot glass in a bath of hydroxyl containing liquid compound near its boiling point.

Another well-known method of rapidly chilling heat-softened glass sheets is by the use of air blasts applied against the opposite major surfaces while providing relative movement between the glass sheets and arrays of spaced nozzles that serve as origins of the air blasts. U.S. Pat. Nos. 2,303,749 and 2,413,722 to Long and 2,131,406 to Mosmieri et al. are typical examples of air blast quenching in the glass tempering art.

Quenching by immersion in a liquid is capable of providing sufficiently rapid chilling to impose a thermal temper in thinner heat-softened glass sheets than those thermally tempered by quenching with air blasts. However, it is virtually impossible to maintain a uniform temper from sheet to sheet by immersion because the pool of liquid into which the heat-softened glass sheets are immersed changes its heat exchange properties with time due to a temperature gradient in the liquid from top to bottom as the effect of exposing the liquid pool to a succession of heated glass sheets takes its toll. In addition, the temperature of the immersion liquid tends to increase with time. Continuously mixing the liquid and controlling the liquid temperature have been tried and, while these efforts have lessened non-uniformity somewhat, the results obtained from such efforts leave something to be desired.

While not all the factors that promote uniform thermal tempering of glass sheets are known, it is believed that if each glass sheet in a series of glass sheets is heated to the same temperature as every other sheet and is then quenched after the same time interval after the heating step ends, using the same amount of quenching fluid, that each sheet should develop the same temper as each other sheet in the series. The principle is attempted in the tempering system disclosed in U.S. Pat. No. 2,838,788 to Hartwig, which relates to the tempering of aircraft skin panels, which are usually of light metal, and provides tempering fluid storing means, and fluid flow discharge control valve means operable to result in the released tempering fluid engulfing, surrounding and bathing the surfaces of the body being treated substantially at the same time. Such a treatment results in the sheets so treated having a non-uniform temper from one end to the other because the first end of the sheet to leave the furnace is cooler than the last end of the sheet to leave the furnace when the entire sheet is simultaneously subjected to a chilling or tempering fluid. As will be explained later, the present invention avoids non-uniform tempering due to this cause.

Immersion dipping to cool heated glass sheets involves exposing the lower portion of the sheet to the liquid bath for a greater duration of exposure than the upper portion. Glass sheets must be lowered into the dip tank and then raised. This makes it difficult to establish a high-speed operation needed for mass production.

When glass sheets are immersed in a pool of tempering liquid, they establish an uncontrolled turbulence in the liquid due to bubbling and convection. This turbulence causes a non-uniform heat transfer, and as a result, the surfaces of glass sheets tempered by heating followed by immersion in a pool of tempering liquid become mottled and require repolishing to restore their optical quantity.

Cullet that results from occasional breakage during tempering is accumulated in the dip tank that contains the liquid used for dip quenching. Periodically, it is necessary to interrupt the tempering operation to remove the cullet that results from such breakage. The method of the present invention does not require a confining dip tank so that cullet removal can be accomplished without interrupting the tempering operation.

Metal springs are tempered according to U.S. Pat. No. 1,362,708 to G. R. Lang by heating followed by pouring cooling liquid in the form of oil over the springs. However, to the best of our knowledge, this technique has never been associated with the handling of glass sheets prior to the present invention and, hence, no suggestion is believed to exist in the prior art that associates a continuous pouring of chilling liquid over a hot glass sheet surface with superior optical properties.

In order to temper glass sheets as uniformly as possible, glass engaging means in the form of self-closing tongs are made as light as possible consistent with the requirement that they have structural stability as well as a minimum possible heat capacity and minimum obstruction to fluid flow in the vicinity of their glass engaging elements. Furthermore, tongs provided with pointed glass gripping elements penetrate the glass when the latter is heat-softened. The penetration zones provide optical flaws that mar the optical properties of the glass sheet. They also fracture the glass surface in many cases, thereby weakening the glass surfaces and sometimes even exposing the tension-stressed interior so that the glass sheet fractures during its processing.

U.S. Pat. No. 3,089,727 to William J. Hay, Jr. eliminates tong points from tongs. Consequently, it reduces the marking of the glass that results from the tong points penetrating the glass sheet surfaces and also reduces optical distortion in the region where the prior art tong points contact the tempered glass plate. Furthermore, the invention permits higher tempering stresses to be established in the glass sheets by virtue of the avoidance of the aforementioned factors resulting from the deep penetration of the tong points into the glass sheet during the tempering operation.

The glass engaging members substituted for the prior art tong points according to the Hay invention are disc-like members mounted so that their peripheral edges engage the glass sheet near its top edge in pressurized contact with its major surfaces. Tongs constructed according to the Hay invention are substantially similar to conventional tongs, except for the substitution of novel glass gripping elements of disc-like configuration for the conventional tong points employed in the past.

The glass-gripping discs of the Hay patent are oriented in horizontal planes when gripping glass sheets supported in a vertical plane. Thus, they must be used with low viscosity and low density gases such as air blasts, in order to prevent the discs from serving as support tables for supporting stagnant volumes of the tempering fluid used in the glass tempering operation. Limiting the tempering fluids permissible to such gases limits the minimum thickness of glass sheets that can be tempered adequately on a mass production basis to those having a nominal thickness of ³⁄₁₆ inch.

Another factor that promotes non-uniform tempering of glass sheets is the so-called edge effect involving breakage associated with severe chilling of the top edge. Breakage of glass along the tong-gripped upper edge during the processing steps associated with tempering is substantially eliminated by the present invention.

THE PRESENT INVENTION

The present invention provides a much more uniform temper from side to side of each glass sheet and from sheet to sheet by providing a constant time interval for each increment of glass sheet in the direction of its movement from a heating area to a chilling area and by applying continuous flows of a cold liquid over the surfaces of the heated glass sheet in such a manner that the flows begin to move over each increment of the surfaces of each of said sheets at an approximately constant time interval atfer each of said increments departs from said heating area. Furthermore, the flow rates are maintained constant throughout the width of the flow by using specially designated nozzles at the end of the flow pipes used to convey the liquid into position to flow across the surfaces of the glass sheets to be treated.

The present invention provides a tong construction that permits the free flow of chilling liquids at a uniform rate across the entire surfaces of the treated sheets, thereby permitting the use of liquids that are more viscous and have a greater heat exchange capacity than air so that the present invention can be used to temper thinner glass sheets than the prior art. To accomplish this end, the present invention suggests glass gripping elements having a thin horizontal dimension (preferably not exceeding ¹⁄₁₆ inch) and an approximately vertical orientation for their major dimensions.

The novel self-closing tongs used to grip the glass during the heating and liquid cooling steps are provided with glass gripping members that are disposed in approximately vertical planes when the tongs hang freely suspended. The glass sheet so gripped hangs vertically so that the continuous sheets of liquid that fan out from the nozzles move uniformly across the surface of the glass sheet undergoing treatment.

The upper edge of the glass sheets which tend to develop temporary tension stresses owing to severe chilling conditions are encompassed in one or more inverted channel-shaped members of fine wire mesh that moderate heat flow along the entire length of the upper edge of the glass sheet.

Apparatus for performing the present invention may comprise a furnace arranged in vertically spaced relation over a chilling station or a furnace arranged in horizontal alignment with the chilling station. A conveyor is provided for moving a single glass sheet from the furnace into the chilling station either vertically or horizontally. The glass sheet, after it is chilled by flood quenching, may be removed along either a horizontal or a vertical path from the chilling station. In a mass production version, a chilling station is disposed in end to end relation beyond a tunnel-like furnace so that a series of glass sheets may be moved in succession through a heating furnace and then immediately through a chilling station where each sheet in turn is subjected to continuous flows of tempering liquid over its entire surface.

Uniformity of glass sheet tempering depends on the uniformity of the tempering liquid. Since the latter tends to entrap bubbles of air and other gases and vapors and tends to change its temperature due to its intermittent contact with hot glass, means is provided to minimize the ratio of air, gas and/or vapor entrapped within the tempering liquid when the latter flows over the glass surface. In addition, heat exchange means is provided to maintain the tempering liquid within a temperature range that is as consistent as possible from sheet to sheet treated and that is well below the temperature at which the tempering liquid volatilizes or decomposes.

Immersion tempering or dip quenching is not capable of as rapid a rate of production as flood quenching because immersion tempering is essentially a batch-type of operation. In contrast, the present invention of flood quenching can be performed by an inherently faster, continuous flow type of operation. The term "flood quenching" involves flowing a liquid that is continuous or that includes a minimum possible amount of entrapped gases in the liquid over the surface of a heated glass sheet and is distinguished from spraying, which is characterized by discrete liquid droplets dispersed in a gas or vapor and which can cause a mottled appearance in the glass surface.

The present invention will be understood more clearly in the light of a description of the embodiments that follows.

DESCRIPTION OF ILLUSTRATIVE EMBODIMENTS

In the various drawings that form part of the description of illustrative embodiments of the present invention, and where like reference numerals refer to like structural elements, FIG. 1 is an oblique assembly view of apparatus for tempering a glass sheet by heating followed by flood quenching in which the glass sheet is moved vertically during its processing from a furnace to a chilling station of the flood quenching type embodying the teachings of the present invention;

FIGS. 3 and 4 are schematic sectional views taken along the lines III—III and IV—IV, respectively, of the FIG. 2 alternate embodiment of tempering apparatus in which the liquid tempering medium is applied in continuous flows onto the glass surfaces as the glass sheets move along a horizontal path through the chilling station;

Figure 1:
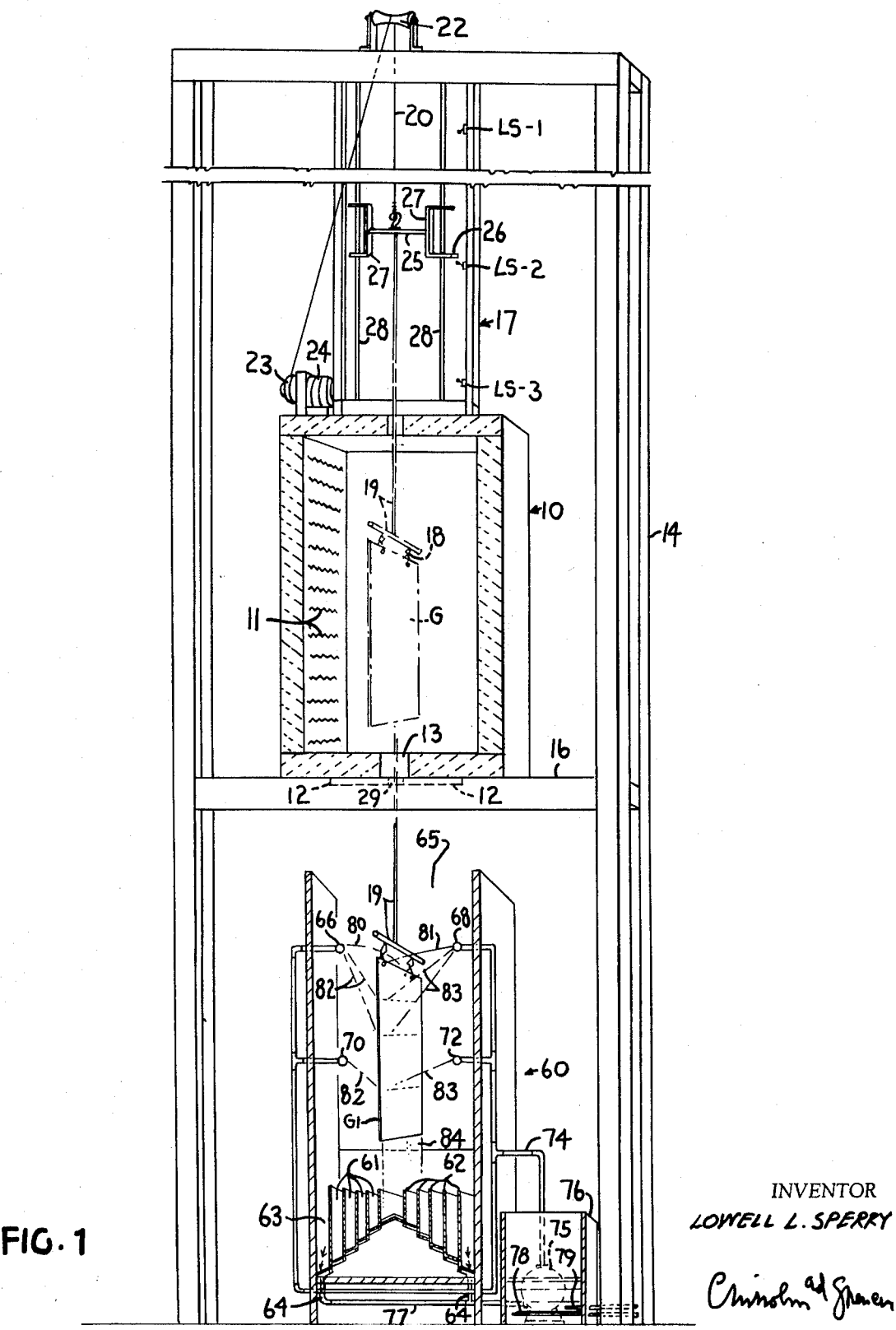

Referring to the drawings, FIG. 1 shows apparatus for performing a vertically oriented process including a furnace 10 having heating elements 11 arranged along the opposite vertical walls thereof and a pair of oppositely moving, slidable doors 12 movable across an exit, slot-shaped opening 13 in the floor of said furnace. A frame structure 14 is provided with an open horizontal platform 16 that supports the floor of the furnace and also provides means for supporting a superstructure 17 mounted on the roof of the furnace 10.

One or more tongs 18 grip a glass sheet G near its upper edge when the glass undergoes processing. Each tong 18 is suspended from a horizontal arm of an inverted T-bar 19, whose vertical arm is suspended from a cable 20. The cable is entrained over a pulley 22 with its end portion wound around a drum 23 rotatable with the drive shaft of a reversible motor 24.

An H-frame member 25 is connected to the upper end of the inverted T member 19. The H-frame member has apertured end brackets 27 that are slidable vertically along vertical guide rods 28 of superstructure 17 to control the orientation of the glass sheet G during processing so that the sheet remains in the same orientation throughout its heating and rapid chilling. The doors 12 have aligned notches 29 to provide clearance for the inverted T member 19 when doors 12 abut one another to close the exit opening 13 of the furnace 10.

The heating elements 11 are arranged along the opposite walls of the furnace to face the major surfaces of the glass sheet G when the latter is heated. Preferably, the heaters are arranged to provide hotter heat sources near the bottom of the furnace than near the top. This counteracts the natural convection current in the furnace and also compensates somewhat for heat loss in the furnace when the bottom opening 13 is open to permit the glass sheet G and its supporting inverted-T member 19 to move through said opening 13.

Figure 5:
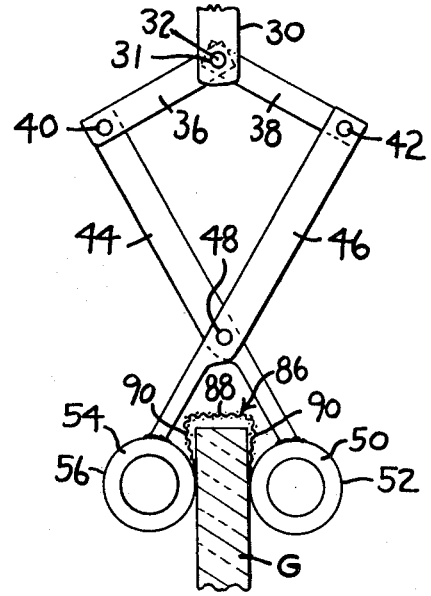
FIG. 5 is an enlarged fragmentary view illustrating in detail glass gripping means and top edge protection means as taught by the present invention.

The tongs 18 used to grip the glass sheets during thermal processing are best shown in FIGS. 3, 4 and 5. However, they are also used in the FIG. 1 embodiment.

Reference number 30 refers to an apertured clevis suspended from the horizontal bar of T-member 19, and having an aperture 31 near its lower end. The clevis aperture 31 provides a support for a long support pin 32 which it carries. Enlarged head rivets (not shown) secure the tong support pin 32 in place on the clevis. Upper tong arms 36 and 38 are pivoted to tong support pin 32 at their upper ends. At their bottom ends, upper tong arms 36 and 38 carry one of a pair of pins 40 and 42. Pins 40 and 42 are provided with enlarged head rivets for the same purpose as tong support pin 32. Lower tong arms 44 and 46 are apertured at their upper portions to receive one or the other of the pins 40 or 42. Thus, pin 40 pivotally attaches the upper portion of lower tong arm 44 to the lower portion of upper tong arm 36, whereas pin 42 pivotally secures the lower portion of upper tong arm 38 to the upper portion of lower tong arm 46.

A common hinge pin 48 pivotally secures lower tong arms 44 and 46 to each other at their lower portion. A glass-gripping element in the form of a thin, centrally apertured, disc-shaped member 50 having a smoothly surfaced, circular periphery 52 is attached to the bottom of lower tong arm 44. Similarly, an identical, thin, disc-shaped member 54 having a smoothly surfaced, circular periphery 56 is attached to the bottom of lower tong arm 46 to serve as an opposing glass-gripping element. Preferably, the maximum thickness of the glass-gripping elements should be approximately 1/16 inch.

In normal position to engage the opposite surfaces of a glass sheet G, the opposing peripheral edge surfaces 52 and 56 of disc-shaped members 50 and 54, respectively, oppose each other in a common vertical plane to make edgewise contact with the opposite surfaces of the glass sheet near its upper edge. Since the tongs are constructed to perform the normal tong principle in which the weight of the gripped glass sheet urges the opposing gripping elements toward each other to engage the opposite surfaces of a sheet gripped therebetween, the opposite surfaces of a glass sheet G are gripped between the periphery 52 of the disc-shaped member 50 and periphery 56 of disc-shaped member 54. Hence members 50 and 54 serve as thin, vertically oriented, glass engaging elements.

Directly below the furnace or heating station 10 is a chilling station 60 which contains the means for applying continuous flows of tempering liquid against the surfaces of a glass sheet located in a quenching position depicted by reference character G1. The station 60 is in the form of a chamber that is considerably higher than the largest vertical dimension of glass sheets being processed. The floor of the chilling station 60 is provided with a series of tilted passages 61 arranged side by side. The passages 61 are tilted downward from the longitudinal center line of the station and also tilted longitudinally and separated by longitudinal walls 62. The latter extend almost the entire length of the passages except for openings at alternate opposite ends thereof to provide tortuous passageways toward sloping gutters 63.

The gutters 63 extend along the opposite longitudinal side walls of the chilling station and are connected to outflow pipes 64 at their lowest ends. The latter pipes 64 communicate with a tempering liquid recirculating system to be described later.

A chilling station 60 is like a box open at its ends and top 65. The top 65 is located directly below and aligned with the slot opening 13 of furnace 10 to facilitate glass sheet movement between the furnace 10 and the chilling station 60.

Any well-known stop means may be used to control the position of the glass sheet G in the chilling station 60 as well as its position in the furnace 10. Actually, limit switches LS–1, LS–2 and LS–3 are positioned for engagement by an extension 26, on one of the apertured end brackets 27 of H-frame member 25. LS–1 controls the uppermost position of the glass sheet in the furnace 10, LS–2 stops the glass sheet at its quenching position G–1, and LS–3 is a safety switch to prevent over travel of the H-frame member 25 in a downward direction in case limit switch LS–2 fails to operate.

The chilling station 60 comprises an upper pair of apertured pipes 60 and 68 and a lower pair of apertured pipes 70 and 72. The pipes are fed tempering liquid through an array 74 of feed pipes, T-joints and elbows from a pump 75. The latter, in turn, is coupled to a storage tank 76. A pipe 77 interconnects outflow pipes 64 to the storage tank 76. Thus, the pipe 77, storage tank 76, pump 75 and pipe array 74 provide means for recirculating said tempering liquid to said apertured pipes 66, 68, 70 and 72, which the tilted passages 61, the gutters 63 and the outflow pipes 64 cooperate with limit switch LS-2 to permit removal of tempering liquid from said glass sheet surfaces and preventing immersion of said glass sheet into said tempering liquid. The storage tank 76 is also provided with a heat exchange means 78. The latter comprises heating and cooling elements and its operation is controlled by a conventional temperature sensing device 79.

The upper pipes 66 and 68 are disposed in a horizontal plane five to six inches above the plane occupied by the lower horizontal pipes 70 and 72. In one embodiment of the invention, the upper pipes have an inner diameter of two inches and are provided with three rows of apertures, the uppermost row of which is located approximately in the horizontal plane passing through the axes of the upper pipes. The apertures comprise a series of holes 0.2 inch in diameter spaced from center to center at a 0.5 inch spacing. The two additional rows of holes are disposed in staggered relation below the uppermost row of holes and are of the same size and spacing. The rows of holes are disposed about 30° apart measured from the respective pipe axis.

The lower pipes 68 and 72 are provided with a single set of holes having the same size and spacing as any of the rows of holes in the upper pipes and are disposed in a common horizontal plane. The pump 75 is operated in such a manner that the tempering liquid used is forced through the various sets of holes to provide continuous flows of the tempering liquid from the sets of apertures toward the qunching position occupied by the glass sheet at G1. The arrangement of the apertures and the pipes is such that the continuous flows 80 and 81 from the uppermost set of holes in the upper pipes 66 and 68 merge above the position occupied by the upper edge of the glass sheet in position G1 and the remaining continuous flows 82 and 83 from the remaining holes in pipe 66 and 68 and from apertured pipes 70 and 72 blend with the continuous flows already established along the surfaces of the glass sheet G at various distances below the upper edge of the glass sheet G.

It is understood that the continuous flow of tempering liquid from each of the apertures in each row of apertures spreads out on contact with a glass surface and merges with the continuous flow from each adjacent aperture in the corresponding row to provide a continous, downward flow of tempering liquid from each row of holes. Thus, the continuous flows of tempering liquid move in downward trajectories from the apertured pipes to impinge downward across the surfaces of the glass sheet G to impart a temper to the glass sheet. The tempering liquid, after it moves across the bottom edge of the glass sheet, drops as a continuous curtain 84 of liquid that is collected in the bottom of the chilling station 60 from which it flows through the removal pipes 64 and 77 into the storage tank 76 where its temperature is measured by the temperature sensing device 79, and, if the temperature of the tempering liquid is found to be outside the upper or lower limits of a desired temperature range, its temperature is adjusted, and the tempering liquid at its adjusted temperature is pumped through the array 74 of feed pipes, T-joints and elbows to the apertured pipes for further dispensing at the desired temperature range.

The pump 76 is actuated shortly before the furnace doors 12 are opened. This permits the flows of tempering liquid to be established before the heated glass sheet G is lowered into the chilling station 60.

When the glass sheet has been exposed to the continuous flows of tempering liquid for sufficient time to impart a temper, it is removed from the chilling station 60, and the pumping operation is stopped. The tongs 18 are released to remove the treated sheet. The tempered glass and the tongs are then cleaned, and a new glass sheet inserted between the gripping elements of the tongs 18 for a subsequent operation. The motor 24 is reversed to lift the new glass sheet into the furnace 10 and a new cycle starts.

The recirculated tempering liquid may be stored in the storage tank 76 in case the apparatus of FIG. 1 is used in a batch-type operation. However, it is necessary to provide for removing excess tempering liquid after it has moved across the surfaces of the glass sheet. This is accomplished by limiting the position of the bottom edge of the glass sheet to one that is always above the upper surface of the pool of tempering liquid that forms at the bottom of the station 60. The amount of tempering liquid in the system comprising the apertured pipes 66, 68, 70 and 72, the array 74, the storage tank 76, the connecting pipe 77 and the removal pipes 64 is limited, so that it is impossible to immerse the glass sheet in the liquid collected at the bottom of the chilling station 60. This feature facilitates obtaining a controlled temper based solely on the flows of tempering liquid sweeping across the surfaces of the sheet at a controlled rate.

Since the glass sheets are gripped by tongs 18, there is a tendency for localized regions of the glass in the vicinity of the glass engaging elements 50 and 54 to experience some irregularities in heat flow during both the heating and the chilling steps. These undesirable irregularities are minimized by the use of the special improved tongs which have both low thermal mass and small cross-sectional areas, especially their glass engaging elements 50 and 54. These glass engaging elements may be thin disc-shaped elements oriented vertically and perpendicular to the gripped surfaces of the glass. They may preferably be only portions of discs such as washers or even portions of washers. Better still, they may be curved segments of wire, preferably of a rigid, refractory, non-sticking material such as tungsten. It is understood that the term "disc-shaped members" used to describe the glass engaging elements of the tongs used in the description of the present invention is meant to cover all the variations of shapes enumerated hereinabove.

The downward trajectories of the continuous flows of tempering liquid tend to shock-chill the upper edge of the treated glass sheet to a greater degree than the chilling they impart to the major surfaces. Hence, means is provided to protect the upper edge portion of the glass sheet to reduce this inequality of chilling. This latter means comprises an inverted channel-shaped screen 86 (FIG. 5) which encompasses the entire length of the upper edge portion of the glass sheet. The inverted channel-shaped screen 86 comprises a web portion 88 spaced vertically from the upper edge of the glass sheet. The inverted channel-shaped screen 86 also comprises a pair of vertical walls 90 which engage the major surfaces of the glass sheet G near the upper edge thereof. It is understood that while the inverted channel-shaped screen 86 is described with reference to the embodiment of FIGS. 2 and higher, that its use is also contemplated for the FIG. 1 embodiment.

Figure 2:
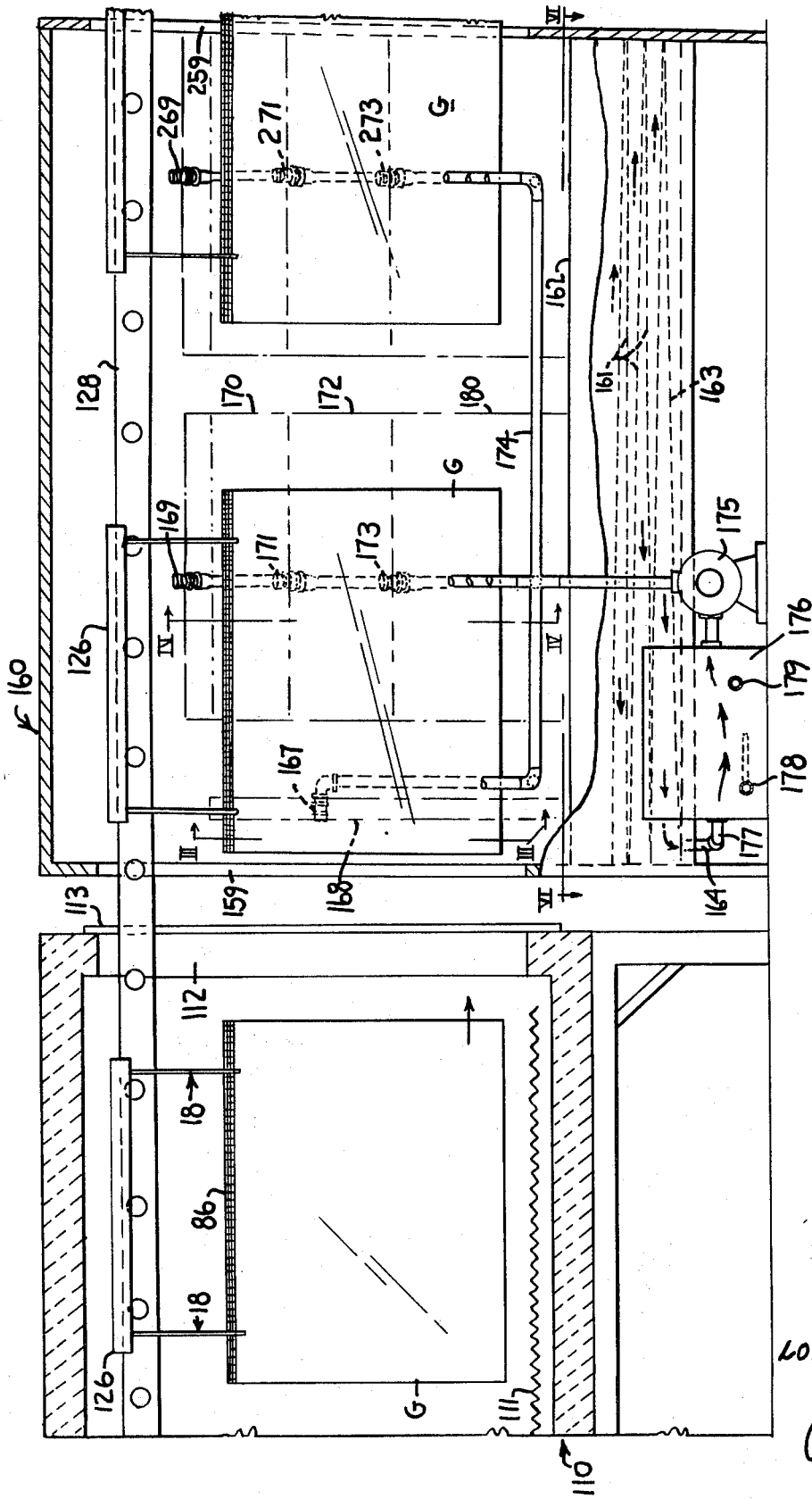
FIG. 2 is a view similar to that of FIG. 1 of an alternate embodiment of apparatus for tempering a succession of glass sheets where the sheets are moved horizontally from the furnace to an alterate embodiment of the chilling station.
Figure 6:
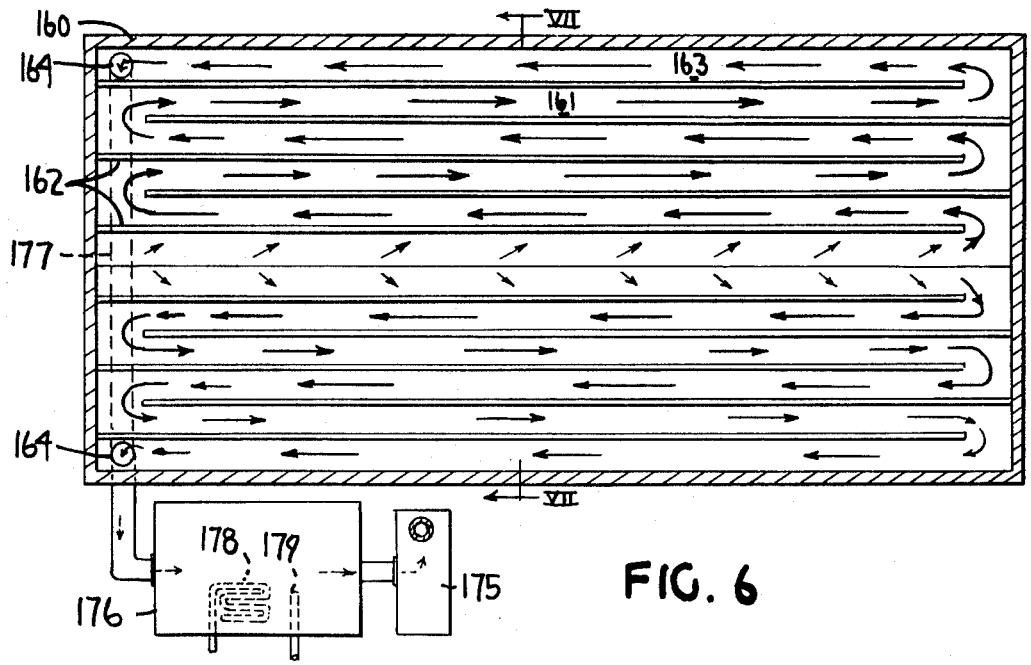
FIG. 6 is a fragmentary plan view taken along the lines VI—VI of FIG. 2, illustrating an operating principle of a tempering liquid recirculating system suitable for use with the present invention.
Figure 7:
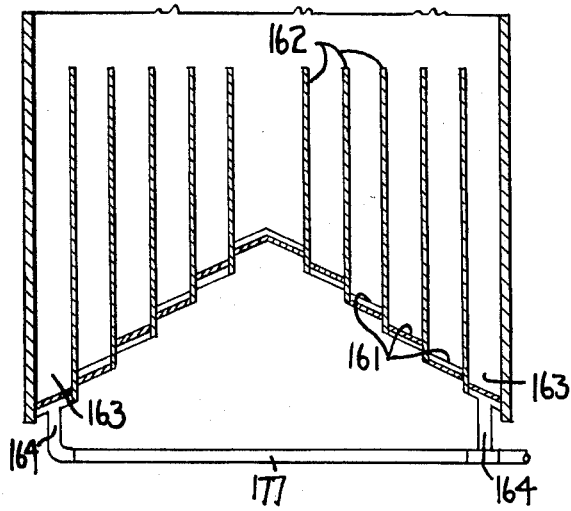
FIG. 7 is a fragmentary transverse sectional view taken along lines VII—VII of FIG. 6.

The embodiment depicted in FIGS. 2 to 7 is more susceptible for use in a mass production operation. In the embodiment of FIG. 2, a tunnel-type furnace 110 with electrical heating elements 111 along its inner walls and having an entrance end (not shown) and an exit end 112 provided with a sliding door 113 movable thereacross, is disposed in end-to-end relationship with a chilling station 160. The latter is open-ended as evidenced by an entrance opening 159 and an exit opening 259 to accommodate a series of carriages 126 disposed along a horizontal path provided by a horizontal conveyor 128. The conveyor extends from a glass loading station at the entrance end of the tunnel-type furnace 110 through the latter and through the chilling station 160.

The latter is aligned horizontally beyond the exit end 112 of the tunnel-type furnace 110. An array 174 of pipes supplies tempering liquid through a pump 175 from a storage tank 176 to various nozzles, 167, 169, 171 and 173.

Adjacent the entrance opening 159 and on opposite sides of the vertical plane occupied by the path of travel taken by a succession of glass sheets G through the tunnel-type furnace 110 and the chilling station 160, as seen in FIG. 3, there is provided a pair of opposing nozzles 167. Each nozzle 167 is oriented to provide a continuous supply of tempering liquid in a continuous fan-shaped flow 171 of liquid that diverges from the nozzle 167 to the adjacent glass surface.

The first set of opposing nozzles 167 adjacent the entrance opening 159 is oriented to provide a fan-shape flow 168 that extends vertically in an oblique plane to impinge against the entire height of the glass sheet G as the latter passes through the obliquely directed continuous flow of tempering liquid. The nozzles 167 are disposed about four inches apart and are symmetrically arranged with respect to the vertical plane passing through the path of travel taken by the succession of glass sheets G.

Further along the chilling station 160 in the direction of glass sheet movement as depicted by the arrow pointed from left to right in FIG. 2, and as shown in FIG. 4, additional nozzle pairs 169, 171 and 173 are provided at the upper end of additional supply pipes in the array 174. The nozzles are disposed in opposing pairs approximately four inches apart in horizontal planes. The uppermost pair of nozzles 169 is arranged to provide continuous flows 170 that intersect just above the upper edge of the glass sheet as the latter transverses the chilling station 160. The other pairs of opposing nozzles 171 and 173 are disposed in horizontal planes spaced approximately four inches apart below one another. Nozzles 169, 171 and 173 are oriented to impart obliquely downward trajectories of diverging, fan-shaped, continuous, uniform sheets or curtains of tempering liquid 170, 172 and 180, respectively, that strike the glass along spaced horizontal lines.

Additional sets of nozzles such as 269, 271 and 273 may be provided further along the path of travel taken by the glass sheets through the chilling station 160. The nozzles used in the chilling station are of the type sold under the trade name FloodJet nozzles distributed by Spraying Systems Company, Bellwood, Illinois, and a description and illustration of these nozzles may be found at page 28 of Catalog 25A of Spraying Systems Company.

The means for removing the curtains or sheets of tempering liquid and for preventing immersion of the glass sheets G after the flows have moved across the glass sheet surfaces in this embodiment is similar to the one provided in the FIG. 1 embodiment. The floor of the chilling station is also provided with a series of longitudinally extending passageways 161 arranged in side by side relation and tilted from end to end longitudinally of the chilling station 160 and also transversely downward from the longitudinal center line thereof. Walls 162 similar to walls 62 of the FIG. 1 embodiment separate the passages from one another to prevent transverse flow from passageway to passageway except at their alternately opposite ends to provide a tortuous path for the tempering liquid to take before it reaches the sloping gutters 163 along the opposite longitudinal side walls of the chilling station 160. Providing a long, tortuous path for the tempering liquid from the time it leaves the glass sheet surfaces until it is recirculated facilitates removal of entrapped bubbles of air, gas or vapor that may become entrapped as the individual flows or curtains impact one another or the glass surface. While a nearly continuous liquid flow having a minor amount of entrapped bubbles yields optical properties superior to those obtained from treating a hot glass surface with a spray of discrete droplets or from immersion in a bath of liquid, superior optical properties require that the curtains of tempering liquid that flow across the glass sheet surfaces be as free from bubbles as possible. Hence, any degassing technique that does not react chemically with the tempering liquid nor cause its temperature to depart from a desired temperature range is suitable.

A removal pipe 177, similar to the removal pipe 77 of the embodiment of FIG. 1, is provided for the chilling station 160. This permits the removal of excess tempering liquid from the tilted gutters 163 at the bottom of the chilling station 160 into the storage tank 176 (similar to storage tank 76) provided with heat exchange means 182 (similar to heat exchange means 82). A pump 176 (similar to pump 76) provides the means for injecting a continuous flow of cooled tempering liquid into the array 174 of pipes to be dispersed through nozzles 167, 169, 171 and 173 toward the path taken by a succession of heated glass sheets G that are conveyed through the furnace 110 and the chilling station 160.

It is understood that while the apertured pipe system for delivering tempering liquid is included in the description of the FIG. 1 embodiment and the nozzle system is included in the description of the FIGS. 2 to 4 embodiment, that either type of delivery system may be incorporated in either embodiment.

Materials suitable for use as tempering liquids include hydrocarbon oils, and various polysiloxanes of the alkyl type, such as dimethyl polysiloxane, diethyl polysiloxane methyl ethyl polysiloxane and of the aryl type such as phenyl polysiloxane. Methyl polysiloxanes, preferably those having a viscosity range of approximately 50 to 100 centistokes at room temperature (about 25° C.), are suitable for most glass thicknesses down to a nominal thickness of about two millimeters or approximately .08 inch, but a lesser viscosity, for example, 20 centistokes, is preferred for thinner glass sheets.

Some of these liquids are available commercially under various trade names. For example, dimethyl polysiloxanes are sold by Dow Corning under the trade names of Dow Corning 200-20, 200-50, 200-100, etc., By General Electric under the trade names of SF96-20, SR96-50, SF96-100, SF97-20, SF97-50, SF97-100, etc. and by Union Carbide under the trade names LE45-20, LE45-50, LE45-100, etc. with the last number following the dash in all cases representing the representative viscosity in centistokes at 25° C. Mobil Oil sells a liquid, hydrocarbon lubricating oil under the trade name of Mobil DTE BB that has a viscosity of 460 centistokes at 25° C.

The top temperature at which the tempering liquid is applied must be carefully controlled at well as the flow rate. The liquid must not be allowed to boil or decompose. Also, the temperature range chosen should be one that can be readily maintained despite intermittent contact with hot glass. For dimethyl polysiloxanes, a bulk temperature range in the storage tank not exceeding 200° F. has produced excellent results, although higher temperatures produce adequate tempering. Flow rates of 50 to 100 gallons per minute per square foot of glass processed have been found to produce good temper in thin glass sheets ranging from 1/16 inch to 5/32 inch in nominal thickness as will be understood from the recitals of the specific examples that follow.

EXAMPLE I

Various glass samples 12 inches square of clear, commercial sheet glass, plate glass or float glass of various thicknesses having approximately the compositions listed in Table I below, were heated in a furnace having a sliding door at its bottom. The sliding door was approximately one foot above a plane occupied by a pair of apertured pipes extending horizontally about four inches apart on opposite sides and equidistant from a vertical plane traversed by the glass sheets. One glass sheet at a time was heated inside the furnace and then lowered from the furnace at a rate of speed indicated below in Table II to between the opposing apertured pipes where dimethyl polysiloxane having a viscosity as indicated was applied at an approximate flow rate of 75 gallons per minute per foot of width of the chilling station occupied by apertured pipes. The flow was maintained for approximately one minute. Then the treated glass sheet was removed and another blass sheet was subjected to the processing.

Surface compression stresses and maximum interior tension stresses were measured and the data compiled in Table II. Compression stress was measured using an instrument known as a differential surface refractometer, using the technique described in an article entiled "The Nondestructive Measurement of Surface Stresses in Glass" by R. W. Ansevin, published in ISA Transactions, Vol. 4 No. 4, October 1965. Maximum tension stresses were measured using the method described in Ceramic Bulletin, Volume 45, page 193 (1966). The optical properties evaluated by inspection were found to be superior to those of similar samples similarly heated, but chilled by dipping or immersing in a tank containing any of several oils, silicones and other well-known quenching liquids. The test results obtained using dimethyl polysiloxanes having different viscosities applied to sheets of various sizes subjected to various treatments are reported in Table II.

TABLE I.—REPRESENTATIVE GLASS COMPOSITIONS, PARTS BY WEIGHT

| Component | Float glass | Sheet glass | Plate glass |
|---|---|---|---|
| $SiO_2$ | 73.05 | 72.58 | 71.68 |
| $Na_2O$ | 13.70 | 13.13 | 33.13 |
| CaO | 8.91 | 8.58 | 11.68 |
| MgO | 3.85 | 3.60 | 2.30 |
| $Na_2SO_4$ | 1 0.37 | 0.58 | 0.72 |
| NaCl | 0.1 | 0.12 | 0.72 |
| $Fe_2O_3$ | 0.13 | 0.11 | 0.15 |
| $Al_2O_3$ | 0.11 | 1.30 | 0.14 |

1 $SO_3$.

TABLE II.—TEST RESULTS FROM FLOOD QUENCHING IN DIMETHYL POLYSILOXANE

| Glass type | Glass thickness (inches) | Temperature (° C.) | Heating time (min.: sec.) | Rate of descent (inches per sec.) | Quenching fluid viscosity (centistokes at 25° C.) | Surface compression (pounds per square inch) | Center tension (pounds per sq. inch) | Glass size (inches) |
|---|---|---|---|---|---|---|---|---|
| Float | 0.106 | 718 | 2:45 | 15 | 50 | 28,000 | 12,600 | 12 x 12 |
| Sheet | 0.117 | 718 | 3:00 | 15 | 50 | 31,000 | 13,000 | 12 x 12 |
| Do | 0.117 | 725 | 3:30 | 13 | 100 | 23,000 | 9,400 | 12 x 12 |
| Do | 0.117 | 725 | 3:30 | 8 | 50 | 29,000 | 12,100 | 4 x 12 |
| Do | 0.117 | 725 | 3:30 | 9 | 100 | 26,000 | 11,600 | 3 x 12 |
| Do | 0.117 | 725 | 4:15 | 13 | 100 | 22,000 | 10,000 | 6 x 12 |
| Do | 0.117 | 725 | 3:00 | 8 | 50 | 33,000 | 11,900 | 2 x 12 |
| Do | 0.068 | 700 | 2:30 | 15 | 50 | 25,000 | 9,500 | 12 x 12 |
| Do | 0.080 | 700 | 2:45 | 15 | 50 | 26,000 | 12,000 | 12 x 12 |
| Do | 0.080 | 775 | 2:00 | 2 | 20 | 34,000 | 15,600 | 2 x 8 |
| Do | 0.080 | 760 | 2:15 | 5 | 20 | 31,000 | 12,800 | 2 x 8 |
| Plate | 0.152 | 790 | 2:00 | 4 | 20 | 27,000 | 14,100 | 1½ x 6 |

Example II

Six glass specimens 2 inches by 12 inches about .117 inch thick of the sheet glass composition recited in Table I were heated one at a time for 3 minutes in the furnace of Example I maintained at a temperature of 725° C. Each heated specimen was then lowered at a rate of 8 inches per second into a continuous flow of approximately 75 gallons per foot of horizontal dimension of cooling station occupied by apertured pipes. The flow liquid was dimethyl polysiloxane having a viscosity of 50 centistokes at 25° C. The flow was maintained for one minute through the apertured pipes arranged as described in Example I.

The average modulus of rupture measured for these samples was 40,000 pounds per square inch with a 5% coefficient of variation. The surface compression stress was 33,000 pounds per square inch as measured by the differential surface refractometer and the internal tension stress as measured by the technique described above was 11,900 pounds per square inch.

Example III

A glass sheet .050 inch thick and 2 inches by 3 inches composed of the soda-lime-silica sheet glass composition listed in Table I was heated in the furnace for 2 minutes at a temperature of 750° C. and then lowered at the rate of 8 inches per second into a chilling station provided with apertured pipes arranged as recited in Example I. As the glass reached the tempering position, it was subjected to continuous flows of a lubricating oil sold under the trade name of Mobil DTE BB having a viscosity of 460 centistokes at 25° C., a viscosity index of 95 and 1000 Saybolt seconds Universal at 100° F. The surface compression as measured by the differential surface refractometer was 41,000 pounds per square inch.

Example IV

Sheet glass specimens 4 inches wide, 12 inches long and .116 inch thick composed of the sheet glass composition recited in Table I were heated in the furnace at 710° C. for 175 seconds and then lowered into a position between opposing arrays of the Flood Jet nozzles of the type described above arranged as 3 pairs of opposed nozzles spaced about 2 inches apart in horizontal lines vertically spaced about 4 inches apart to provide a total flow of approximately 50 gallons per minute of 50 centistokes viscosity dimethyl polysiloxane. The surface compression stress of a typical specimen measured 25,000 p.s.i., while its interior tension stress measured 10,5000 p.s.i. Its optical characteristics were excellent.

The various examples listed above depict operations in which flat glass sheets were tempered. It is also within the purview of the present invention to shape the heated glass sheet between its heating and chilling steps. This can be accomplished by interposing a press bending station between the furnace and the chilling station in the direction of glass sheet movement. Thus, the press bending station may be in vertical alignment between the furnace or heating station 10 and the chilling station 60 of the first embodiment or in horizontal alignment between the furnace 110 and the chilling station 160 of the FIG. 2 embodiment.

The continuous fan-shaped flows are forced to move across both the convex and concave surfaces of the shaped glass as well as the edge surfaces due to the trajectories of the tempering liquid. Similarly, while the present invention shows glass supported in a vertical orientation while it is being flood quenched, it is also possible to quench the glass sheet while is is in an orientaton different from a vertical orientation, i.e., while supported in an oblique or a horizontal plane. However, it is necessary to apply the continuous flows at a small acuate angle to the glass surfaces.

In practice, it is common for microscopic bubbles and/or solid particles of dirt to become entrapped within the circulating tempering liquid. These bubbles give the tempering liquid a turbid appearance. As long as the tempering liquid composition retains characteristics more closely resembling those of a liquid rather than those of a spray, the optical properties and the degree of temper obtained are superior to those obtained by spraying with a spray characterised by discrete droplets. If the amount of minutes bubbles or particles entrapped in the tempering liquid is small enough so as not disturb the smooth flowing pattern of liquid flooding, the human eye is unable to detect any non-uniformity in optical properties. It is only when entrapped gases, vapors and/or solids are present in an amount sufficient to disrupt the smooth liquid flow pattern associated with flood quenching than an observable pattern begins to appear to the naked eye.

Because the present invention utilizes the flooding of heated glass sheets by smooth, macroscopically homogenous flows of liquid as distinct from sprays of individual droplets, surfaces having much better optical properties than those produced by spraying or immersing heated glass result. Furthermore, streams that are almost continuous where the bulk density of the liquid in the streams applied to the glass surfaces is a substantially larger proportion of the density of the pure liquid than is the case in conventional spraying can also produce optical properties superior to those produced by spraying the heated glass. Streams or flows containing a minor proportion of bubbles or other particles insufficient to produce optical variations visible to the naked eye are recited herein as "approximately continuous." The term "substantially continuous" as claimed herein means both continuous and approximately continuous.

The form of the invention shown and described in this disclosure represents an illustrative preferred embodiment and certain modifications thereof with respect to glass treatment, although other materials less critical than glass may also be tempered using the systems suggested by the present invention. However, because of the need to be very careful in the handling of glass in order to obtain good optical properties consist with good temper, flood quenching as taught herein is especially suitable for processing glass sheets. It is understood that various changes may be made without departing from the gist of the invention as defined in the claimed subject matter which follows.

I claim:

1. In the art of tempering a glass sheet with a continuous curtain of liquid over opposing surfaces of the sheet comprising heating said sheet to an elevated temperature range sufficiently high for thermal tempering but below the softening point of the sheet and then chilling said heated sheet to below the strain point of the glass at a rate of chilling rapid enough to impart a thermal temper to said glass sheet, the improvement comprising maintaining a supply of tempering liquid, which has sufficient heat exchange properties to develop a temper in a glass sheet when flowed across the surface of a glass sheet heated to it tempering temperature, at a sufficiently cold temperature to temper said heated glass sheet on contact therewith, applying flows of said cold liquid that provide substantantially continuous flood of the liquid against the opposing surfaces and across the width of said glass sheet while said glass sheet is at said elevated temperature range in such a manner that said flows move downwardly in a flow pattern over said surfaces at a rate sufficient to impart a thermal temper to said glass sheet, and removing said flows from contact with said glass sheet surfaces without immersing said glass sheet in said liquid.

2. The improvement as in claim 1, comprising heating a succession of glass sheets and providing relative movement between said heated glass sheets and said continuous flows along a path of relative movement, thereby chilling each heated glass sheet in succession by applying said continuous flow over each increment of said surfaces from one end thereof to the other end thereof in the direction of said path of relative movement at an approximately constant time interval after ending the exposure of said increment to a source that provides said heating.

3. The improvement as in claim 2, wherein each of said increments is exposed to approximately the same volume of tempering liquid provided by said flows.

4. The improvement as in claim 1, where self-closing tongs having opposed, thin, vertically oriented, glass engaging elements engage the surfaces of said glass sheet through said opposed, thin elements to support said glass sheet in an upright position.

5. The improvement as in claim 4, further including enclosing the upper edge of said glass sheet engaged by said thin elements with a channel shaped wire mesh disposed in heat-exchanging relation only to said upper edge.

6. The improvement as in claim 1, wherein said tempering liquid is taken from the class of liquids consisting of polysiloxanes and hydrocarbon oils.

7. The improvement as in claim 6, wherein said polysiloxane liquid has a viscosity between approximately 20 to approximately 100 centistokes at 25° C.

8. The improvement as in claim 2, wherein said cold liquid is recirculated between successive applications and said cold liquid is cooled between selected of said applications when the temperature of said liquid approaches a temperature at which the heat transfer characteristics of said liquid changes beyond a desired range of said characteristics as a consequence of its intermittent contact with said heated glass sheets so that each glass sheet in said succession is contacted by said cold liquid when the latter is within a temperature range between normal room temperature and below the decomposition temperature and the boiling point for said liquid.

9. The improvement as in claim 8, wherein said liquid is taken from the class of liquids consisting of polysiloxanes and hydrocarbon oils.

10. The improvement as in claim 9, wherein said polysiloxane liquid has a viscosity between approximately 20 and approximately 100 centistokes at 25° C.

11. The improvement as in claim 1, wherein said glass sheet is heated at a location above that at which it is chilled and is moved vertically downward from said location where it is heated past said continuous flows of tempering liquid until the entire glass sheet including its upper edge is exposed to said continuous flows of tempering liquid so that said tempering liquid contacts said glass sheet surface froom its bottom edge to its top edge.

12. The improvement as in claim 11, wherein adjacent increments of said glass sheet beginning with its lower edge contact said continuous flows and wherein each of said continuous flows forms a horizontal line of contact with each horizontally extending increment of said glass sheet that moves vertically downward into said continuous flows to enable said flows to sweep across the major surfaces of said glass sheet.

13. The improvement as in claim 11, wherein each of said continuous flows of tempering fluid moves in a downward trajectory toward said glass sheet to impinge downward across the surfaces of the glass sheet at sufficient rate of flow to impart a temper to said glass sheet and to drop as a curtain below the bottom edge of the glass sheet.

14. The improvement as in claim 11, wherein at least the lower portion of said glass sheet is swept by a plurality of flows across each major surface thereof.

15. The improvement as in claim 11, wherein said continuous flows are established before said glass sheet is removed from said location in which it is heated.

16. The improvement as in claim 1, wherein said flows are removed from contact with said glass sheet surfaces by conveying said glass sheet in a horizontal direction from said flows.

(References on following page)

References Cited

UNITED STATES PATENTS

| | | | |
|---|---|---|---|
| 3,677,729 | 7/1972 | Plumat | 65—30 |
| 2,199,511 | 5/1940 | Perry et al. | 85—114 |
| 3,493,357 | 2/1970 | Agett et al. | 65—116 |
| 3,392,006 | 7/1968 | Seymour | 65—114 X |
| 2,198,739 | 4/1940 | Phillips | 65—116 |
| 3,186,816 | 6/1965 | Wartenberg | 65—116 |

FOREIGN PATENTS

| | | | |
|---|---|---|---|
| 442,633 | 1936 | Great Britain | 65—348 |
| 811,269 | 1951 | Germany | 65—348 |

ARTHUR D. KELLOGG, Primary Examiner

U.S. Cl. X.R.

65—104, 116

UNITED STATES PATENT OFFICE
CERTIFICATE OF CORRECTION

Patent No. 3,725,024          Dated April 3, 1973

Inventor(s) Lowell L. Sperry

It is certified that error appears in the above-identified patent and that said Letters Patent are hereby corrected as shown below:

Column 2, line 63, "quantity" should be --quality--.
Column 3, lines 74 and 75, "designated" should be --designed--.
Column 5, line 69, "long" should be --tong--.
Column 6, line 71, "60" should be --66--.
Column 7, line 4, "which" should be --while--.
Column 7, line 34, "qunching" should be --quenching--.
Column 10, line 44, "SR 96-50" should be --SF 96-50--.
Column 11, line 11, "blass" should be --glass--.
Column 11, Table I, under Plate Glass, "33.13" should be --13.13--.
Column 11, Table I, under Plate Glass, the second "0.72" should be --0.12--.
Column 12, line 64, "is" (first occurrence) should be --it--.
Column 12, line 68, "acuate" should be --acute--.
Column 13, line 3, "minutes" should be --minute--.
Column 13, Claim 1, line 54, "it" should be --its--.

Signed and sealed this 25th day of December 1973.

(SEAL)
Attest:

EDWARD M. FLETCHER, JR.          RENE D. TEGTMEYER
Attesting Officer                Acting Commissioner of Patents